(12) United States Patent
Yu

(10) Patent No.: US 7,751,185 B2
(45) Date of Patent: Jul. 6, 2010

(54) DOCKING STATION APPLIED TO A PORTABLE ELECTRONIC DEVICE

(75) Inventor: Chien-Cheng Yu, Xizhi (TW)

(73) Assignee: Amtek System Co., Ltd., Taipei Hsien (TW)

( * ) Notice: Subject to any disclaimer, the term of this patent is extended or adjusted under 35 U.S.C. 154(b) by 99 days.

(21) Appl. No.: 12/211,176

(22) Filed: Sep. 16, 2008

(65) Prior Publication Data

US 2010/0067190 A1    Mar. 18, 2010

(51) Int. Cl.
*G06F 1/16*    (2006.01)

(52) U.S. Cl. .................. 361/679.41; 248/675; 348/375; 710/303; 362/287

(58) Field of Classification Search .................. 362/105, 362/106, 287; 726/324; 455/3.04, 557; 348/375; 345/156, 157, 158; 710/100, 302, 303; 361/679.03, 361/679.29, 679.41, 679.58, 679.44, 679.31; 248/201, 675

See application file for complete search history.

(56) References Cited

U.S. PATENT DOCUMENTS

2002/0078291 A1*  6/2002  Sutton et al. ................. 710/302
2008/0002351 A1*  1/2008  Carnevali .................... 361/686

\* cited by examiner

*Primary Examiner*—Hung V Duong
(74) *Attorney, Agent, or Firm*—Kile Goekjian Reed & McManus PLLC

(57) ABSTRACT

A docking station applied to a portable electronic device includes a casing module, a circuit module, a first input/output module and a second input/output module. The casing module has a casing, an opening formed on the casing, and a cover pivoting around the casing in order to selectively open or close the opening. The circuit module is disposed inside the casing. The first input/output module is disposed on the casing and electrically connected between the circuit module and a plurality of different peripherals. The second input/output module is disposed on the casing and electrically connected between the circuit module and an external connector of the portable electronic device. Therefore, when a rear side of the portable electronic device pushes the cover, the cover is opened in order to make one part of the rear side of the portable electronic device pass through the opening and receive in the casing.

12 Claims, 7 Drawing Sheets

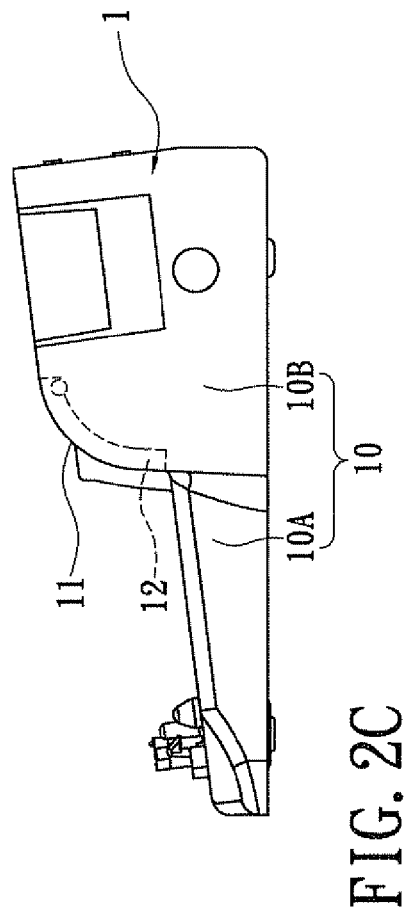
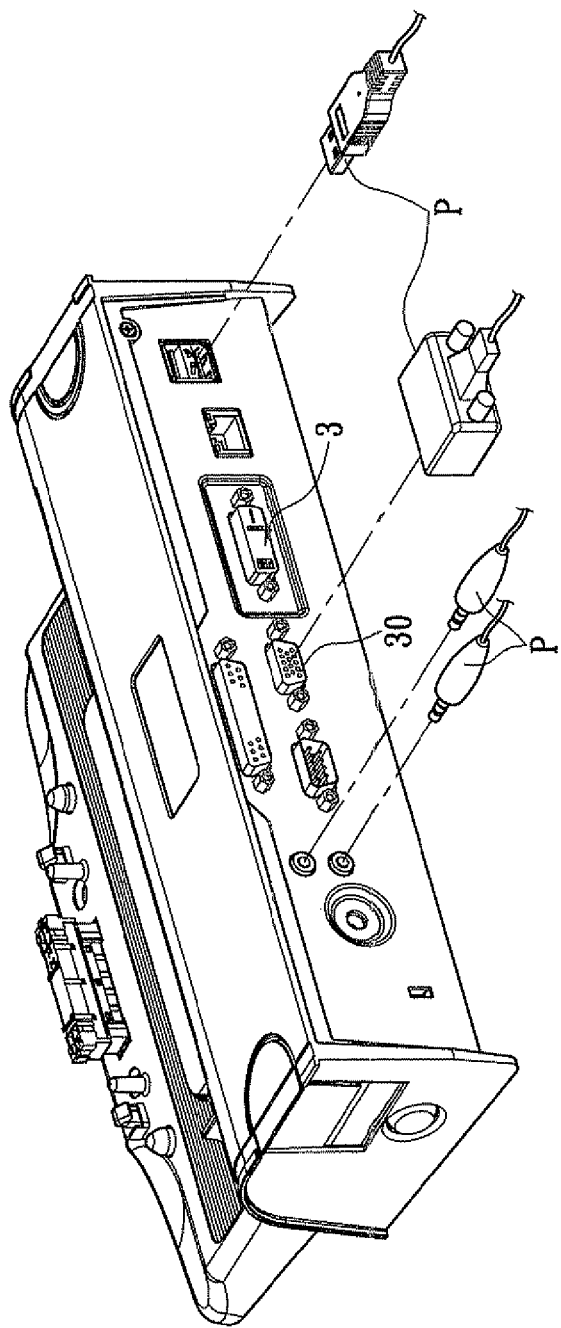
FIG. 2B
FIG. 2C

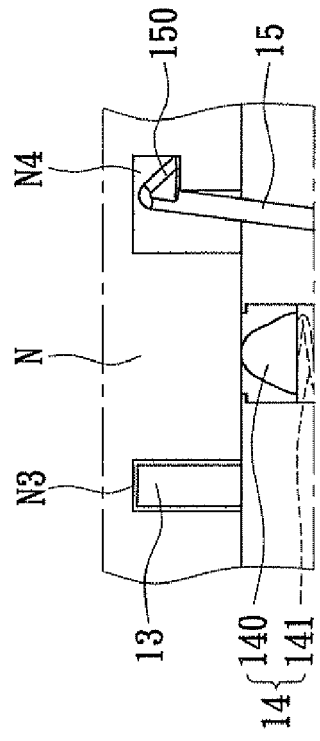
FIG. 4A1
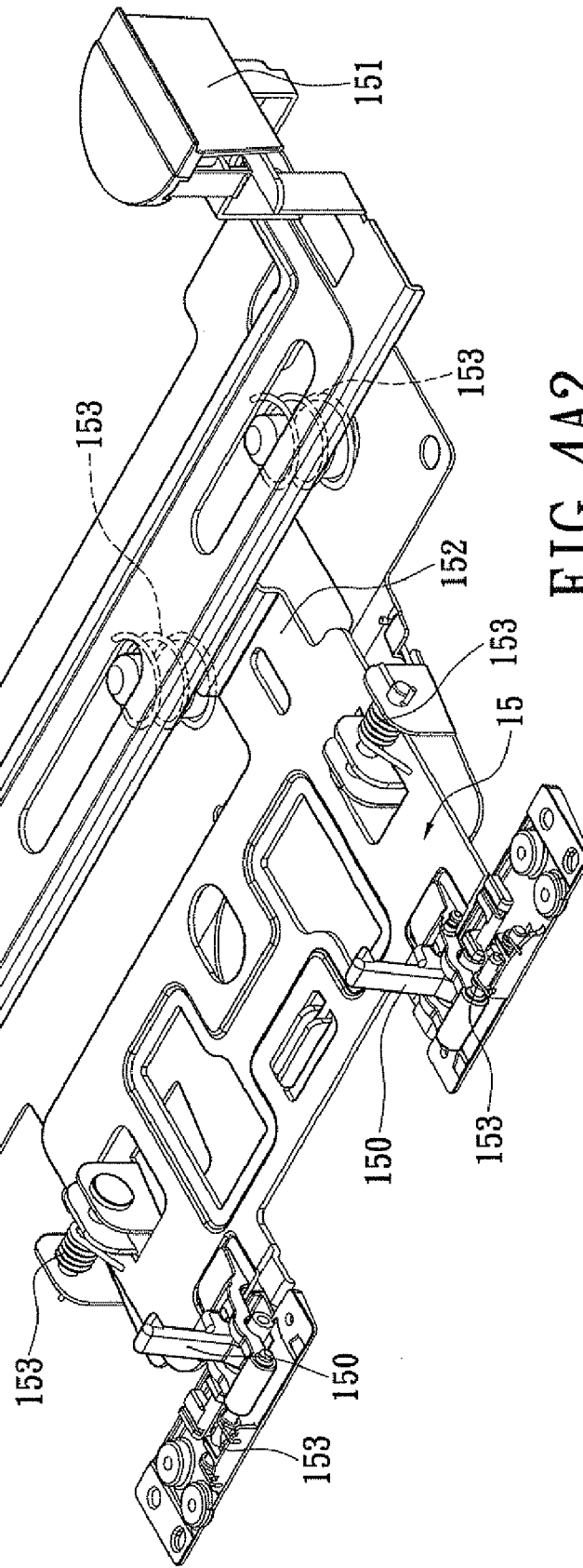
FIG. 4A2

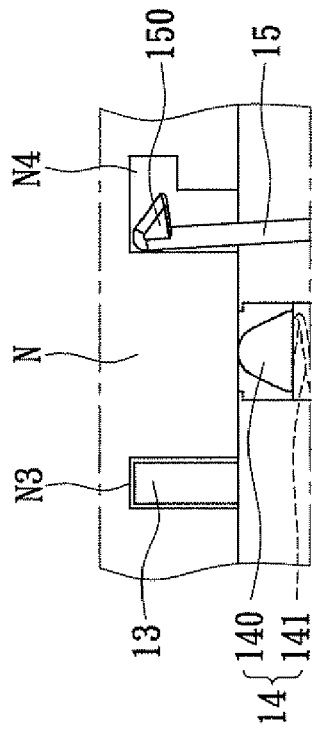
FIG. 4B1
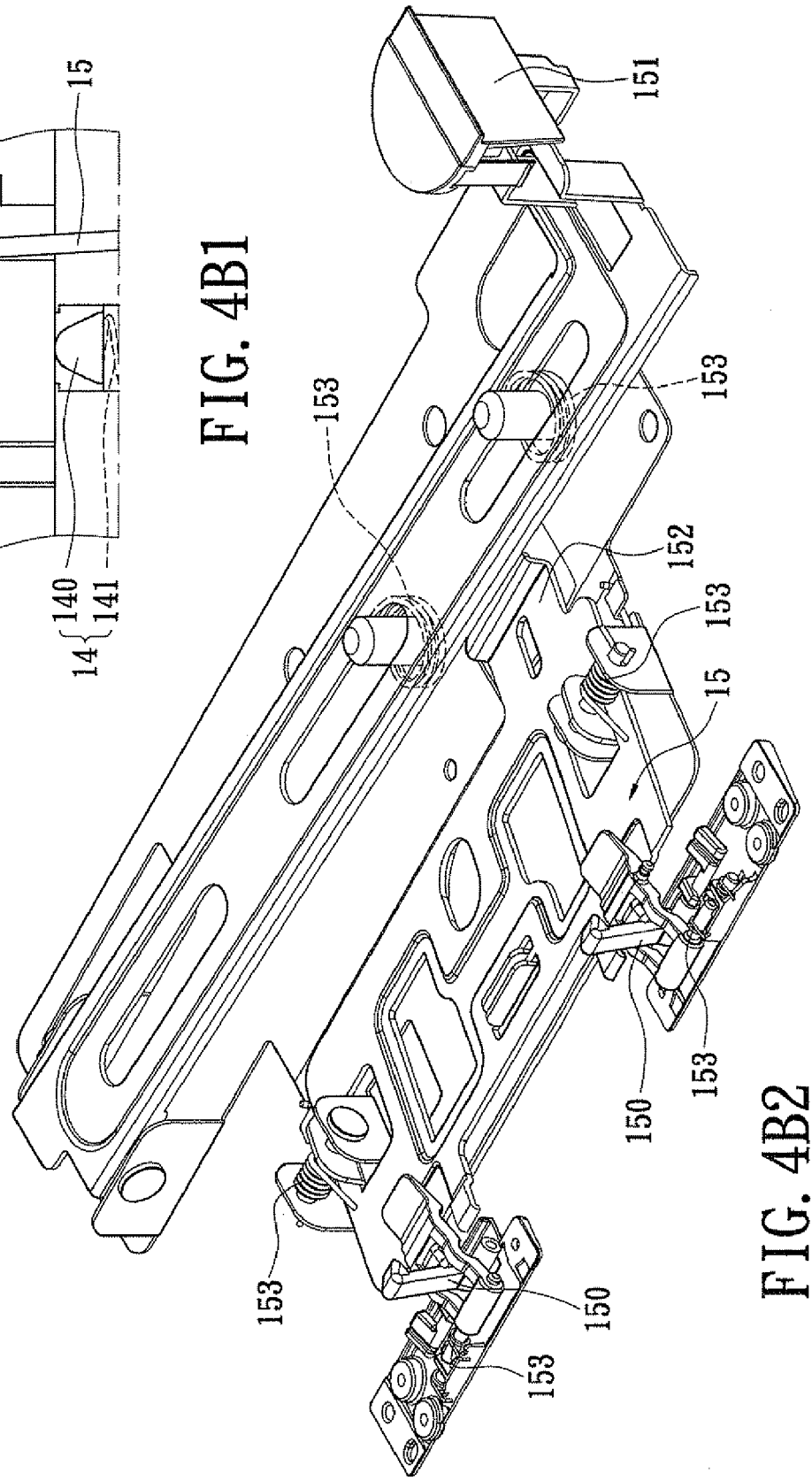
FIG. 4B2

DOCKING STATION APPLIED TO A PORTABLE ELECTRONIC DEVICE

BACKGROUND OF THE INVENTION

1. Field of the Invention

The present invention relates to a docking station, and particularly relates to a docking station applied to at least one portable electronic device.

2. Description of the Related Art

Under the prevailing design trend that demands lean and light, the size of notebook computers is constantly reduced. However, some mechanisms and elements have size limitations to keep the notebook computer functional. In order to reduce the size of notebook computers while maintaining the same functionality as desktop computers, a docking station has been developed.

The docking station includes connection ports conforming to a plurality of interface specifications, such as a Universal Serial Bus (USB), a PS/2 port, IEEE1394, a parallel port, a serial port, an Ethernet port (RJ-45) and optical disk, and the like. By separating the design of the docking station and the notebook computer, the weight and size of the notebook computer may be greatly reduced. When there is a need to connect to peripheral devices, mount the notebook computer on the docking station, the peripheral devices may be connected to perform data transmission or the notebook computer may be charged.

However, when a portable electronic device with a large size battery wants to mate with the docking station of the prior art, the portable electronic device cannot mate with the docking station of the prior art due to the large size battery. In other words, one part of the large size battery is projected from the portable electronic device, so that the large size battery affects the match between the portable electronic device and the docking station.

SUMMARY OF THE INVENTION

One particular aspect of the present invention is to provide a docking station applied to at least one portable electronic device. When a portable electronic device mates with the docking station of the present invention, the present invention does not be limited by the size of a battery module of the portable electronic device.

In order to achieve the above-mentioned aspects, the present invention provides a docking station applied to at least one portable electronic device, including: a casing module, a circuit module, a first input/output module and a second input/output module. The casing module has a casing, an opening formed on the casing, and a cover pivoting around the casing in order to selectively open or close the opening. The circuit module is disposed inside the casing of the casing module. The first input/output module is disposed on the casing of the casing module and electrically connected between the circuit module and a plurality of different peripherals. The second input/output module is disposed on the casing of the casing module and electrically connected between the circuit module and an external connector of the portable electronic device. Therefore, when a rear side of the portable electronic device pushes the cover, the cover is opened in order to make one part of the rear side of the portable electronic device pass through the opening and receive in the casing of the casing module.

Hence, no matter what the portable electronic device uses the battery module with a special standard (large size battery) or with a normal standard (small size battery), the portable electronic device can mate with the docking station.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objects and advantages of the present invention will be more readily understood from the following detailed description when read in conjunction with the appended drawings, in which:

FIG. 2B is a second perspective, assembled view of a docking station applied to at least one portable electronic device of the present invention;

FIG. 2C is a lateral, assembled view of a docking station applied to at least one portable electronic device of the present invention;

FIG. 4A1 is a lateral, schematic view of a docking station mated with a portable electronic device (before moving a retaining module) according to the present invention;

FIG. 4A2 is a perspective, schematic view of a docking station mated with a portable electronic device (before moving a retaining module) according to the present invention;

FIG. 4B1 is a lateral, schematic view of a docking station mated with a portable electronic device (after moving a retaining module) according to the present invention;

FIG. 4B2 is a perspective, schematic view of a docking station mated with a portable electronic device (after moving a retaining module) according to the present invention.

DETAILED DESCRIPTION OF THE PREFERRED EMBODIMENTS

Figure 1:
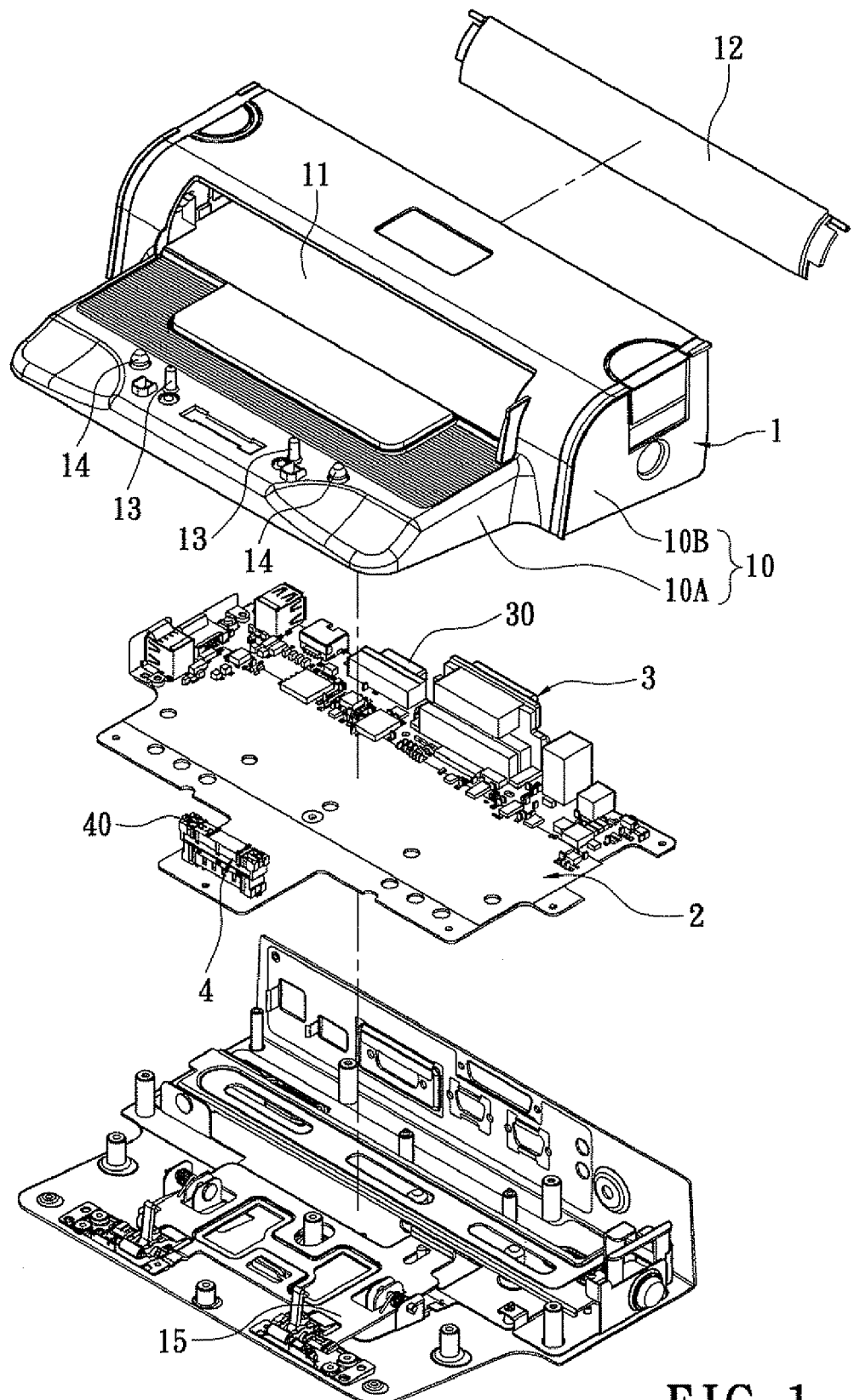
FIG. 1 is a perspective, exploded view of a docking station applied to at least one portable electronic device of the present invention.
Figure 2A:
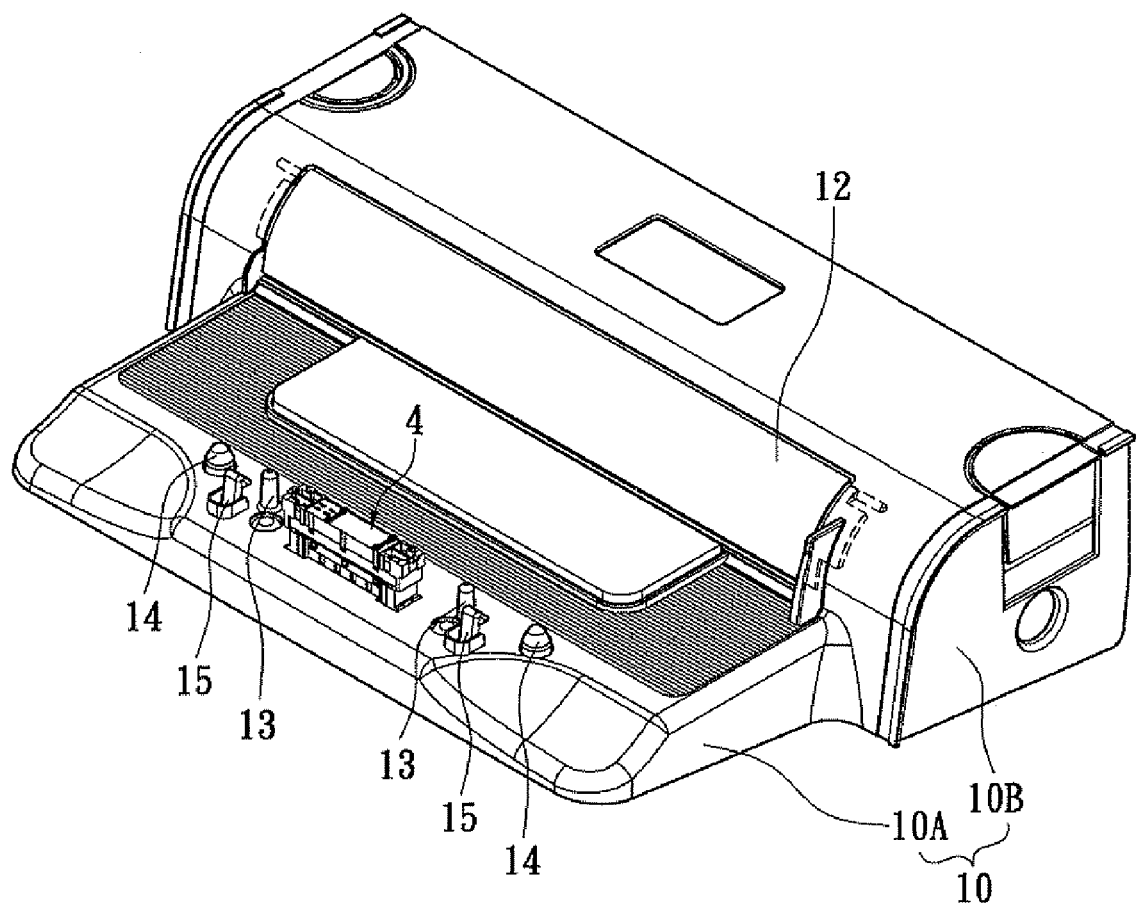
FIG. 2A is a first perspective, assembled view of a docking station applied to at least one portable electronic device of the present invention.

Referring to FIGS. 1 and 2A, the present invention provides a docking station applied to at least one portable electronic device, including: a casing module 1, a circuit module 2, a first input/output module 3, and a second input/output module 4.

The casing module 1 has a casing 10, an opening 11 formed on the casing 10, and a cover 12 pivoting around the casing 10 in order to selectively open or close the opening 11. In addition, the casing 10 is divided into a front casing 10A and a rear casing 10B, and the height of the front casing 10A is less than the height of the rear casing 10B In the present invention, the opening 11 is formed on a front side of the rear casing 10B, and the cover 12 pivots around the front side of the rear casing 10B.

Moreover, the casing module 1 further includes: at least two positioned protrusions 13 disposed on a top side of the front casing 10A, an elastic module 14 disposed on a top side of the front casing 10A, and a retaining module 15 disposed on a top side of the front casing 10A.

Furthermore, the circuit module 2 is disposed inside the casing 10 of the casing module 1. In the present invention, the circuit module 2 is disposed inside the front casing 10A and the rear casing 10B.

Referring to FIG. 2B, the first input/output module 3 is disposed on the casing 10 of the casing module 1 and electrically connected between the circuit module 2 and a plurality of different peripherals P. In the present invention, the first input/output module 3 is disposed on a rear side of the rear casing 10B, and the first input/output module 3 has a plurality of ports 30 electrically mated with the different peripherals P.

Figure 3A:
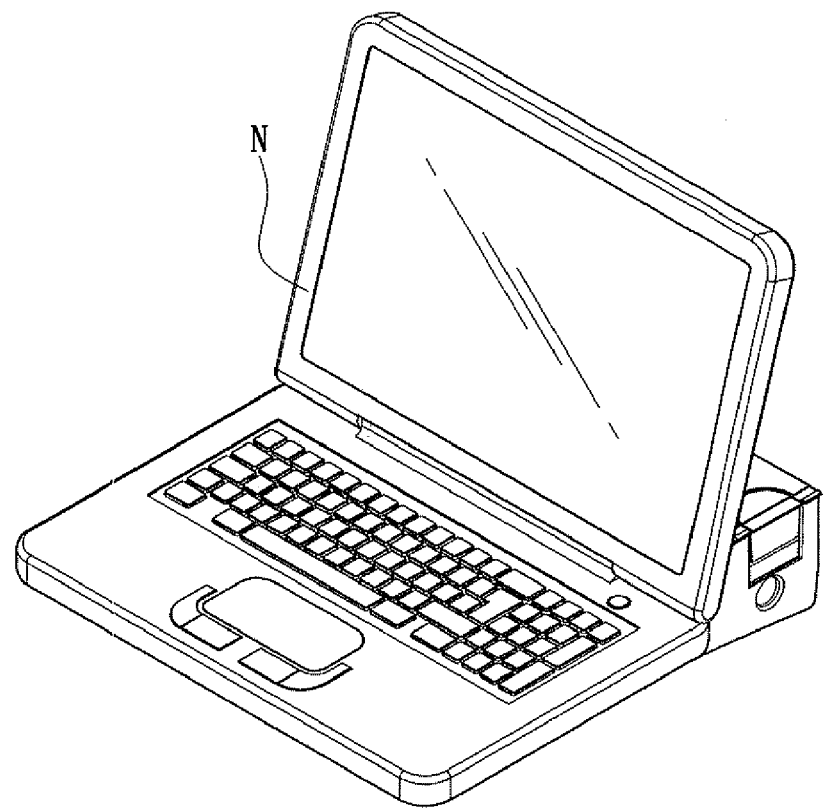
FIG. 3A is a perspective, assembled view of a docking station mated with a portable electronic device according to the present invention.
Figure 3B:
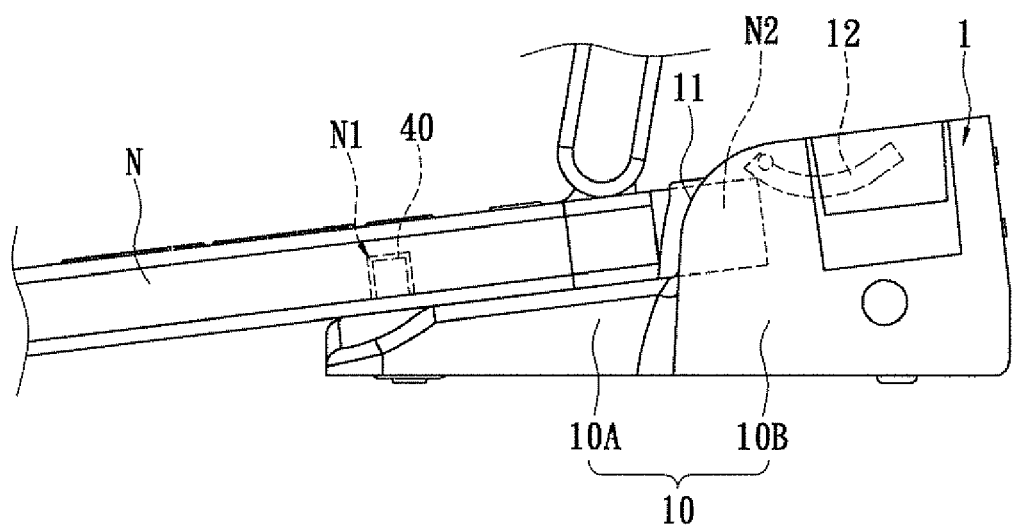
FIG. 3B is a lateral, assembled view of a docking station mated with a portable electronic device according to the present invention.

Referring to FIGS. 3A and 3B, the second input/output module 4 is disposed on the casing 10 of the casing module 1 and electrically connected between the circuit module 2 and an external connector N1 of the portable electronic device N. In the present invention, the second input/output module 4 is disposed on a top side of the front casing 10A, and the second input/output module 4 is an electrical connector 40 electrically mated with the external connector N1 of the portable electronic device N.

Referring to FIGS. 2C and 3B, the portable electronic device N has a battery module N2, one part of the battery module N2 is projected from a rear side of the portable electronic device N, and the cover 12 of the casing module 1 is opened due to the push of the battery module N2. In other words, when the rear side of the portable electronic device N (the rear side of the battery module N2) pushes the cover 12, the opening 11 is shown in an open state in order to make one part of the rear side of the portable electronic device N (one part of the rare side of the battery module N2) pass through the opening 11 and receive in the rear casing 10B of the casing 10 of the casing module 1.

Hence, no matter what the portable electronic device uses the battery module N2 with a special standard (large size battery) or with a normal standard (small size battery), the portable electronic device can mate with the docking station. In other words, when the portable electronic device mates with the docking station, the present invention does not be limited by the size of the battery module N2 of the portable electronic device N.

Referring to FIGS. 4A1 and 4A2, the two positioned protrusions 13 are respectively mated with two positioned grooves N3 that are disposed on a bottom side of the portable electronic device N in order to position the portable electronic device N on the top side of the front casing 10A.

Moreover, the elastic module 14 includes at least two movable protrusions 140 and at least two elastic elements 141 respectively disposed under the movable protrusions 140 in order to respectively push upwards the two movable protrusions 140. One part of each movable protrusion 140 is only exposed outside the top side of the front casing 10A due to the limitation of the front casing 10A.

Furthermore, the retaining module 15 mates with two retaining grooves N4 that are disposed on a bottom side of the portable electronic device N. In addition, the retaining module 15 includes: two movable retaining bodies 150 projected from the top side of the front casing 10A in order to respectively mate with the two retaining grooves N4, a pressing body 151 disposed on a top side of the rear casing 10B, a joint mechanism 152 disposed between the two movable retaining bodies 150 and the pressing body 151, and a plurality of elastic bodies 153 for making the two movable retaining bodies 150, the pressing body 151 and the joint mechanism 152 return to their original positions.

Figure 4C:
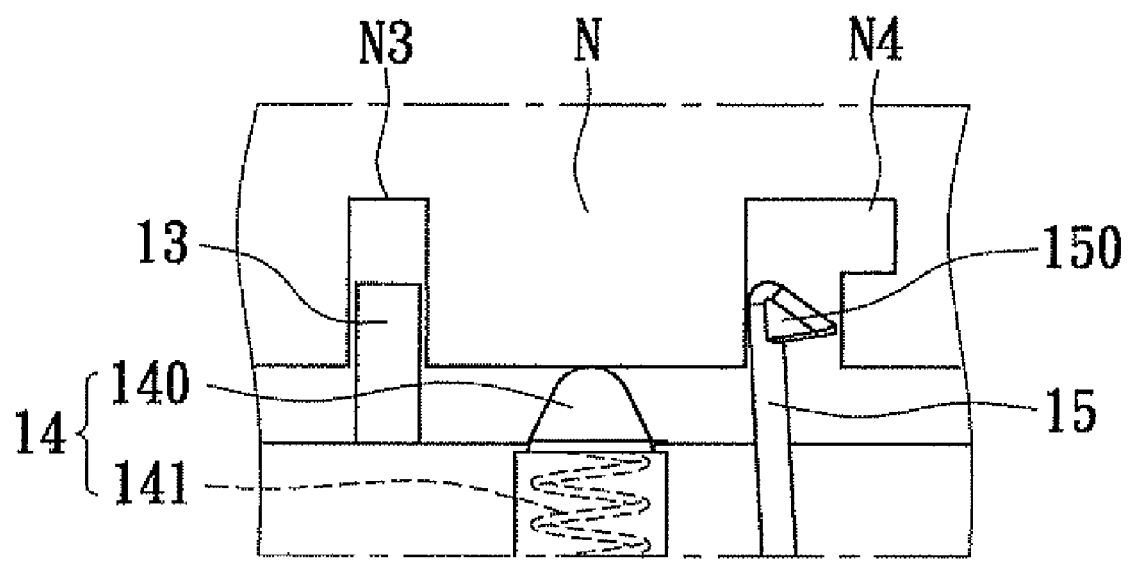
FIG. 4C is a lateral, schematic view of a portable electronic device separated from a docking station (after an elastic module is projected outwards) according to the present invention.

Referring to FIGS. 4B1 and 4B2, when the pressing body 151 is pressed, the joint mechanism 152 is driven by the pressing body 1 5 1 in order to separate the two movable retaining bodies 150 from the two retaining grooves N4. At the same time, referring to FIG. 4C, the portable electronic device N is moved upwards due to the elastic force generated by the elastic elements 141 of the elastic module 14. Hence, it is easy for a user to carry on the portable electronic device N.

In conclusion, no matter what the portable electronic device uses the battery module N2 with a special standard (large size battery) or with a normal standard (small size battery), the portable electronic device can mate with the docking station. In other words, when the portable electronic device mates with the docking station, the present invention does not be limited by the size of the battery module N2 of the portable electronic device N.

Although the present invention has been described with reference to the preferred best molds thereof; it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A docking station applied to at least one portable electronic device, comprising:
    a casing module having a casing, an opening formed on the casing, and a cover pivoting around the casing in order to selectively open or close the opening;
    a circuit module disposed inside the casing of the casing module;
    a first input/output module disposed on the casing of the casing module and electrically connected between the circuit module and a plurality of different peripherals; and
    a second input/output module disposed on the casing of the casing module and electrically connected between the circuit module and an external connector of the portable electronic device;
    whereby, when a rear side of the portable electronic device pushes the cover, the cover is opened in order to make one part of the rear side of the portable electronic device pass through the opening and receive in the casing of the casing module.

2. The docking station as claimed in claim 1, wherein the casing is divided into a front casing and a rear casing.

3. The docking station as claimed in claim 2, wherein the height of the front casing is less than the height of the rear casing, the opening is formed on a front side of the rear casing, and the cover pivots around the front side of the rear casing.

4. The docking station as claimed in claim 2, wherein the circuit module is disposed inside the front casing and the rear casing.

5. The docking station as claimed in claim 2, wherein the first input/output module is disposed on a rear side of the rear casing, and the first input/output module has a plurality of ports electrically mated with the different peripherals.

6. The docking station as claimed in claim 2, wherein the second input/output module is disposed on a top side of the front casing, and the second input/output module is an electrical connector electrically mated with the external connector of the portable electronic device.

7. The docking station as claimed in claim 2, wherein the casing module further comprises: at least two positioned protrusions disposed on a top side of the front casing, and the two positioned protrusions are respectively mated with two positioned grooves that are disposed on a bottom side of the portable electronic device in order to position the portable electronic device on the top side of the front casing.

8. The docking station as claimed in claim 2, further comprising: an elastic module disposed on a top side of the front casing in order to push upwards the portable electronic device.

9. The docking station as claimed in claim 8, wherein the elastic module includes at least two movable protrusions and at least two elastic elements respectively disposed under the movable protrusions in order to respectively push upwards the two movable protrusions, and one part of each movable protrusion is only exposed outside the top side of the front casing due to the limitation of the front casing.

10. The docking station as claimed in claim 2, further comprising: a retaining module disposed on a top side of the front casing in order to mate with two retaining grooves that are disposed on a bottom side of the portable electronic device.

11. The docking station as claimed in claim 10, wherein the retaining module includes: two movable retaining bodies projected from the top side of the front casing in order to respectively mate with the two retaining grooves, a pressing body disposed on a top side of the rear casing, a joint mechanism disposed between the two movable retaining bodies and the pressing body, and a plurality of elastic bodies for making the two movable retaining bodies, the pressing body and the joint mechanism return to their original positions; wherein the joint mechanism is driven by the pressing body in order to separate the two movable retaining bodies from the two retaining groove.

12. The docking station as claimed in claim 1, wherein the portable electronic device has a battery module, one part of the battery module is projected from a rear side of the portable electronic device, and the cover of the casing module is opened due to the push of the battery module.

\* \* \* \* \*